United States Patent
Strachan et al.

(10) Patent No.: US 6,752,850 B1
(45) Date of Patent: Jun. 22, 2004

(54) LIQUID SOIL CONDITIONER

(75) Inventors: Graham George Strachan, Forest Hill (AU); Glenn Stuart McDonald, Cranbourne North (AU)

(73) Assignee: Ultimate Products (Aust) Pty LTD, Victoria (AU)

( * ) Notice: Subject to any disclaimer, the term of this patent is extended or adjusted under 35 U.S.C. 154(b) by 139 days.

(21) Appl. No.: 09/926,748

(22) PCT Filed: Jun. 16, 2000

(86) PCT No.: PCT/AU00/00683
§ 371 (c)(1),
(2), (4) Date: Jan. 3, 2002

(87) PCT Pub. No.: WO00/78893
PCT Pub. Date: Dec. 28, 2000

(30) Foreign Application Priority Data

Jun. 18, 1999 (AU) .............................................. PQ1023
Jun. 21, 1999 (AU) .............................................. PQ1044
Mar. 10, 2000 (AU) .............................................. PQ6178

(51) Int. Cl.$^7$ .............................................. C05D 3/02
(52) U.S. Cl. .......................... 71/63; 71/64.1; 71/64.08
(58) Field of Search ........................ 71/63, 64.1, 64.08

(56) References Cited

U.S. PATENT DOCUMENTS

| 4,133,669 | A | * | 1/1979 | Caldwell et al. ................ 71/54 |
| 4,256,691 | A | * | 3/1981 | Ott ................................. 422/7 |
| 4,321,079 | A | * | 3/1982 | Ott ................................. 71/61 |
| 4,430,281 | A | * | 2/1984 | Boylan et al. ............... 264/118 |
| 5,997,599 | A | * | 12/1999 | Wommack et al. ............ 71/11 |

FOREIGN PATENT DOCUMENTS

| AU | 503623 | 9/1979 | |
| AU | 3606697 | 5/1998 | |
| CA | 2044048 | 7/1992 | |
| DE | 4029955 | 3/1992 | |
| EP | 924176 A1 | * 6/1999 | ............ C05D/3/02 |
| FR | 2372131 | 7/1978 | |

OTHER PUBLICATIONS

Tokai Rubber Ind KK, Derwent Abstract No. 81–42710, D/24, Class E36, J56043340A, Sep. 19, 1979.
Shi H, Derwent Abstract No. 98–0335458/04, Class C04, CN 1136028, Jan. 10, 1996.
Zhang Y, Derwent Abstract No. 97–403450/38, Class C04, CN 1113221, Apr. 3, 1995.

* cited by examiner

*Primary Examiner*—C. Sayala
(74) *Attorney, Agent, or Firm*—Dennison, Schultz, Dougherty & MacDonald

(57) ABSTRACT

A liquid soil conditioning composition is disclosed. The composition is in the form of an aqueous dispersion of rock lime and sulfur where the atomic ratio of calcium to sulfur is in the range 0.9:1 to 1.3:1. The particle size of the rock lime and the sulfur is 5 $\mu$m average. The liquid compositions improve the agricultural productivity of clay soils.

20 Claims, No Drawings

LIQUID SOIL CONDITIONER

TECHNICAL FIELD

This invention relates to liquid soil conditioners for agricultural use and more particularly to liquid soil conditioners comprising of aqueous suspensions of non amorphous calcium carbonate. The invention also relates to methods of treating agricultural land to improve its productivity.

BACKGROUND OF THE INVENTION

Many soils have what is known as poor structure. This is characterised by low water penetration, surface crusting when dry, restricted root growth of plants and poor germination of seeds. It is desirable to improve soils having poor structure. Soils may also be deficient in that their acidity is too high, i.e. the pH is too low. For many agricultural uses a pH of about 6.5 is considered optimum. Many soils are acid with pH of 5.5 or less. It is hence desirable to raise the pH of acid soils.

It is known that a high sodium content in the soil is a primary cause of poor structure. When a soil with high sodium content becomes wet, very fine clay particles disperse into the soil water. They are transferred with this water and settle out in the fine pores between the soil particles. This causes the pores to become blocked. The soil becomes dense, and the movement of water, air, plant roots and tillage equipment is significantly hindered. This reduces the productivity of whatever crop or pasture is growing on that area. Clay soils fall into this category of soils.

Gypsum which is calcium sulfate has traditionally been used to improve the friability or structure of clay soils by reducing the sodium levels in the soil. The calcium ions formed from the disassociation of the gypsum displace the sodium ions from the surface of the clay particles. The sodium can then be eluted through the soil. The bound calcium allows the clay particles to link into a lattice network of particles resulting in a more open soil structure.

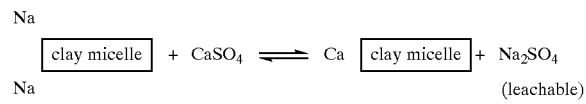

Typically gypsum is used in a granular form and must be applied at very high rates, commonly about five tonnes per hectare in heavy clay soils. It can therefore be difficult and expensive to spread.

Furthermore, it is not feasible to apply bulk gypsum in many situations, as the spreading equipment is too large. For example, in many vineyards the rows of vines are too close together to allow access for a large vehicle.

A further problem with granular gypsum is that it may take twelve months or more to become effective as the particle size is relatively large. The effectiveness of the gypsum in exchanging the sodium ions in the clay is directly related to the surface area of the gypsum exposed to the clay. Finer particles have a greater surface area than larger particles for the same given weight of gypsum.

Gypsum particles are typically of the order of 1 mm diameter (1000 micron) or more. Although, finer particles could be produced by milling, the gypsum dust produced by this process can cause difficulties in application. Furthermore, the application of granular gypsum can cause soil compaction from the spreading machines. The spreading machines are usually heavy as they carry several tonnes of gypsum. The compaction caused by the tyres can be substantial. Those areas which become compacted are difficult to be planted with crops unless the soil is further tilled and returned to its uncompacted state.

Other products which can be used to displace sodium ions are available as alternatives to gypsum, but they have major disadvantages. For example, sulfur may be applied to soil for conditioning purposes. Sulfur undergoes microbial oxidation in soil to form sulfuric acid which in turn may react with lime (if any) present in the soil to form calcium sulfate, gypsum. It is usually only added to soil if it is deficient in sulfur. However, sulfur powder is generally difficult to spread.

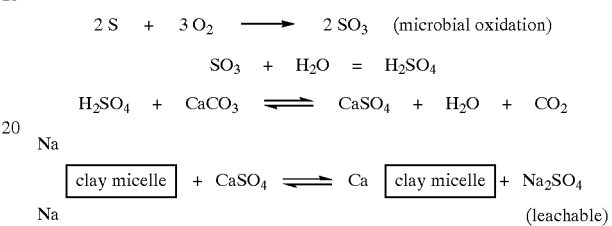

Sulfuric acid may also be directly applied to soil. Upon application to soils containing calcium carbonate, it reacts to form calcium sulfate. However, being a strong acid, it is difficult to work with, requiring special acid resistant equipment. Calcium chloride forms calcium ions on addition to soil and these displace the sodium ions in the clay in the same way as the calcium ions from gypsum do. However, the residual product from this reaction is sodium chloride. Salinity is already a major problem in many agricultural areas and, for most users, the application of calcium chloride is not a viable option to address a clay problem.

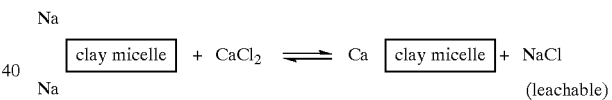

With regard to the treatment of acid soils, one method used is to apply granulated limestone ($CaCO_3$). However, the usual particle size of this material leads to the material having to be applied at very high rates. Furthermore, with this known treatment the pH tends to change relatively slowly, taking up to twelve months to lead to significant improvements. The requirement of large application rates causes similar difficulties to those discussed earlier for the application of gypsum.

Other methods have been proposed to improve the agricultural productivity of soil by adding soil conditioners.

Australian Patent 691460 discloses the application of an aqueous dispersion of calcium carbonate in a special precipitate form. A number of additives may be included in this formulation and these include well known agricultural materials such as herbicides, insecticides, metals and chelates. Sulfur is also mentioned as an optional additive when the soil is deficient in sulfur. The purpose of these compositions is to increase the pH of the soil. The relative quantities of the additives are not set out.

French Patent 2372131 relates to a special blend of three ingredients, two of which are sulfur and calcium carbonate. The volume ratio of calcium carbonate to sulfur in their blend is 3 to 1.

Canadian Patent CN 1113221 and CN 11136028 disclose foliar spray compositions for agricultural use. These are quite different from the soil applied soil conditioner of the present application.

Australian Patent 630806 discloses agricultural compositions based on deposit lime. In this patent they claim much greater efficacy for deposit lime compared to rock lime. They state that rock lime is essentially ineffective when used in their aqueous slurries.

The object of the present invention is to avoid some of the problems associated with the use of the above products.

SUMMARY OF THE INVENTION

This invention provides in one form a liquid soil conditioning composition in the form of an aqueous dispersion of calcium carbonate and sulfur wherein the atomic ratio of calcium to sulfur is in the range 0.5:1 to 2.0:1.

Preferably the atomic ratio of calcium to sulfur is in the range 0.75:1 to 1.5:1.

More preferably the atomic ratio of calcium to sulfur is in the range 0.9:1 to 1.3:1.

Preferably the composition includes a suspension or dispersing agent.

Preferably the suspension or dispersing agent is selected from bentonite and polyvinylalcohol.

Preferably the calcium carbonate is in non amorphous form.

More preferably the calcium carbonate is rock lime.

In an alternative form this invention provides a liquid soil conditioning composition comprising rock lime suspended in water wherein the rock lime has particle size average diameter less than 10 $\mu$m with maximum particle size 50 $\mu$m.

Preferably the average diameter is less than 5 $\mu$m with maximum particle size 25 $\mu$m.

Preferably the composition further comprises a suspension or dispersing agent that is a water soluble polymer.

Preferably the water soluble polymer is polyvinylalcohol. Preferably the composition comprises 700–1000 g/litre of water of calcium carbonate.

Preferably the amount of calcium carbonate is about 900 g/litre of water.

In a further alternative form this invention provides a method of improving soil agricultural productivity of clay soils without substantially changing the pH of the soil by applying an effective amount of a liquid soil conditioning composition in the form of an aqueous dispersion of calcium carbonate and sulfur wherein the atomic ratio of calcium to sulfur is in the range of 0.5:1 to 2.0:1.

In a still further form this invention provides a method of increasing the pH of agricultural soils by applying an effective amount of a liquid soil conditioning composition comprising rock lime suspended in water wherein the rock lime has particle size average diameter less than 10 $\mu$m with maximum particle size 50 $\mu$m.

DETAILED DESCRIPTION OF THE INVENTION

The invention will now be described in greater detail with reference to a particularly preferred embodiment in the form of an aqueous liquid dispersion or suspension. 900 grams of superfine rock lime was added per litre of water and blended in combination with one or more suspension and dispersion agents such as polyvinylalcohol. While 900 g/litre produces useful compositions of up to 1500 g/litre can also be used. Rock lime is a term known in this art field to include calcium carbonate as found in nature where there is a significant degree of crystallinity. An example is marble. This calcium carbonate is non amorphous and thus different from deposit lime which is the result of sedimentary deposits. It will be appreciated that there are varying extents of crystallinity as the material is classified as a metamorphic material. It will also be appreciated that the suspension agent polyvinylalcohol is usually in the form of a partially hydrolysed polyvinylacetate polymer. Typically 90% of the acetate esters are hydrolysed to produce a water soluble dispersion. In the above preferred composition polyvinylalcohol 12g is added. The pH is then adjusted to 9 by the addition of potassium hydroxide. Other suspension agents may be used. Examples include cellulosic derivatives such as hydroxyethylcellulose. Other suspension agents may be used and examples are bentonite, and ionic and non ionic surfactants. The selection of appropriate suspension agents will be made by taking into account cost effectiveness. To this dispersion, about 250 grams of sulfur powder, combined with a wetting agent to assist in dispersion, was blended into the dispersion. The wetting agent can be selected from this well known class of material that includes ionic and non ionic agents. The quantities described in the preferred embodiment above result in a liquid with a calcium content of about 35% and a sulfur content of about 25%. This provides an atomic ratio of calcium to sulfur of 1.15:1. The atomic ratio is calculated by dividing the weight ratio by the atomic weight of calcium and sulfur respectively. The calcium carbonate and sulfur are preferably a superfine grade with an average particle size of about 5 microns. The fine particle size allows the aqueous dispersion of the invention to be used readily in installations where fine filters are in place and allows the dispersion to be used in a wide range of current machinery without the need for modification or adjustment thereof. Of course, dependent on the soil requirements, coarser particle sizes can be used and larger particle sizes would still be effective providing of course any necessary modifications to equipment, including alterations of filters were taken into account.

The dispersion of the invention is applied to the soil optionally with the aid of a suspension agent such as polyvinylalcohol and directed onto the soil by way of spray or drip such that the dispersion is allowed to migrate into the soil structure thereby being exposed to oxygen and accordingly the oxidation process is effected in situ throughout the structure of the soil allowing for the formation of calcium sulfate (gypsum) in situ within the structure of the soil.

The method of the invention allows the blend of calcium carbonate and sulfur, when applied to the soil, to result in a similar reaction to that of gypsum applied directly to the soil. However, the application of an aqueous solution provides vastly improved delivery means and avoids many of the difficulties of applying gypsum or the application of sulfur powder per se to the soils. In the first instance, the application of an aqueous solution is far more controllable by way of piping or spray delivery than that of gypsum powder. The liquid delivery of the dispersion of the invention can of course be applied through irrigation, boom sprays or any other available system where water is applied to plants or soils. Accordingly, a wide variety of commercial growers and other potential users, who would not previously have envisaged using gypsum, now have access to a greatly improved delivery method and dispersion product to assist them in breaking down and treating their clay soils.

The very small particle size of the calcium carbonate and sulfur components of the dispersion results in a far more rapid response than the use of traditional gypsum which uses a far greater particle size. The exchangeable sodium percentage (ESP) is a common measure of the soil sodium level in a soil. A soil with high ESP will generally have poor water penetration and will develop surface crusting and be difficult for most root systems to penetrate and productively grow. The methods and formulations of the invention are able to substantially reduce the ESP value in a period of 4 weeks with a single application. Field trials have demonstrated the superior performance of the dispersion and method of the invention when contrasted with bulk gypsum. The composition of the example described above was applied to a heavy clay soil at rates of 40 l/acre and 60 l/acre relative to an untreated control and soil treated with gypsum at a conventional application rate. The ESP of the soil was test after four weeks. The results were 11.5 for the control, 11.5 for the conventional gypsum treatment, 8.9 for the example of this invention at the lower application rate and 8.51 for the example of this invention at the higher application rate.

In this invention the calcium carbonate need not contain exclusively calcium as the metal and minor amounts of magnesium can be included without detracting significantly from the effectiveness of the product. For example, dolomite which is form of calcium that contain magnesium carbonate may be used.

Tests have shown that when the dispersion of the invention is applied and the methods used there is no appreciable change in the pH of the soil 4 weeks after use. Although calcium carbonate is an alkaline product and may be expected to increase the alkalinity of the soil, this effect is offset by the conversion of the sulfur in the dispersion product to sulfuric acid and any pH changes are therefore buffered.

The product can be used in a wide range of situations including home gardens where the dispersion of the invention could be applied by way of a watering can or with a provision of a ready to use hose pack. Alternatively, the dispersion could be applied directly to the soil from a squeeze bottle and hosed in afterwards. All of the applications of the invention are far more convenient and environmentally friendly than using and spreading bulk gypsum.

Finally as an alternative to the preparation of calcium sulfate in situ, a superfine gypsum could be applied to the soil by way of an aqueous dispersion directly. However, the end product would have a lower concentration of calcium and sulfur than in the particularly preferred dispersion and methods of the invention. For example, the application of superfine gypsum directly would result in between 15 and 22% calcium and 10 and 17% sulfur, whereas the dispersion of the invention provides a 35% calcium delivery and 25% sulfur delivery.

What is claimed is:

1. A liquid soil conditioning composition comprising an aqueous dispersion of calcium carbonate and sulfur, the calcium and sulfur being in an effective amount in the aqueous dispersion to form calcium sulfate, in situ, in the soil structure, wherein the atomic ratio of calcium to sulfur is in the range of 0.5:1 to 2.0:1.

2. A liquid soil conditioning composition as defined in claim 1 wherein the atomic ratio of calcium to sulfur is in the range of 0.75:1 to 1.5:1.

3. A liquid soil conditioning composition as defined in claim 2 wherein the atomic ratio of calcium to sulfur is in the range of 0.9:1 to 1.3:1.

4. A liquid soil conditioning composition as defined in claim 1 wherein the composition includes a suspension or dispersing agent.

5. A liquid soil conditioning composition as defined in claim 4 wherein the suspension or dispersing agent is selected from the group consisting of bentonite and polyvinylalcohol.

6. A liquid soil conditioning composition as defined in claim 1 wherein the calcium carbonate is in non amorphous form.

7. A liquid soil conditioning composition as defined in claim 6 wherein the calcium carbonate is rock lime.

8. A liquid soil conditioning composition comprising calcium carbonate in the form of rock lime and sulfur suspended in water wherein the rock lime has a particle size average diameter of less than 10 μm with a maximum particle size of 50 μm and the atomic ratio of calcium to sulfur is in the range of 0.5:1 to 2.0:1.

9. A liquid soil conditioning composition as defined in claim 8 wherein the average diameter is less than 5 μm with a maximum particle size 25 μm.

10. A liquid soil conditioning composition as defined in claim 8 wherein the composition further comprises a suspension or dispersing agent that is a water soluble polymer.

11. A liquid soil conditioning composition as defined in claim 10 wherein the water soluble polymer is polyvinylalcohol.

12. A liquid soil conditioning composition as defined in claim 9 wherein the composition comprises 700–1000 g/litre of water of calcium carbonate.

13. A liquid soil conditioning composition as defined in claim 12 wherein the amount of calcium carbonate is about 900 g/litre of water.

14. A method of improving agricultural productivity of clay soils without substantially changing the pH of the soil by applying a liquid soil conditioning composition in the form of an aqueous dispersion of calcium carbonate and sulfur, the atomic ratio of calcium to sulfur being in the range of 0.5:1 to 2.0:1, the liquid conditioning composition being applied in an effective amount to form calcium sulfate in situ with the soil structure.

15. The method of claim 14 wherein the calcium carbonate is in non amorphous form.

16. The method of claim 14 wherein the calcium carbonate is rock lime.

17. The method of claim 16 wherein the rock lime has a particle size average diameter of less than 10 μm with a maximum particle size of 50 μm.

18. The method of claim 17 wherein the particle size average diameter is less than 5 μm with a maximum particle size of 25 μm.

19. The method of claim 14 wherein the liquid soil conditioning composition further comprises a suspension or dispersing agent.

20. The method of claim 14 wherein the liquid soil conditioning composition comprises 700–1000 g/litre of calcium carbonate.

* * * * *